United States Patent
Watanabe et al.

(10) Patent No.: US 11,458,793 B2
(45) Date of Patent: Oct. 4, 2022

(54) VEHICLE HEIGHT ADJUSTMENT DEVICE

(71) Applicant: KYB Corporation, Tokyo (JP)

(72) Inventors: Hirotomo Watanabe, Tokyo (JP); Takuhiro Kondo, Tokyo (JP); Shigeo Wataya, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 17/288,299

(22) PCT Filed: Sep. 30, 2019

(86) PCT No.: PCT/JP2019/038504
§ 371 (c)(1),
(2) Date: Apr. 23, 2021

(87) PCT Pub. No.: WO2020/110451
PCT Pub. Date: Jun. 4, 2020

(65) Prior Publication Data
US 2021/0379950 A1 Dec. 9, 2021

(30) Foreign Application Priority Data
Nov. 26, 2018 (JP) .............................. JP2018-220072

(51) Int. Cl.
*B60G 17/015* (2006.01)
*F16F 1/12* (2006.01)

(52) U.S. Cl.
CPC .............. *B60G 17/015* (2013.01); *F16F 1/12* (2013.01); *B60G 2204/12* (2013.01); *B60G 2500/30* (2013.01)

(58) Field of Classification Search
CPC .................................................... B60G 17/015
See application file for complete search history.

(56) References Cited

U.S. PATENT DOCUMENTS 6,557,380 B1    5/2003  DiFrank et al.
7,780,177 B2 *  8/2010  Michel ............... B60G 17/0157
                                                280/124.146
(Continued)

FOREIGN PATENT DOCUMENTS

DE      10000144 A1   7/2001
DE   102015202463 A1   8/2015
(Continued)

OTHER PUBLICATIONS

Germany Office Action in the Application No. 11 2019 005 870.3 dated Mar. 5, 2022.

*Primary Examiner* — Nicole T Verley
(74) *Attorney, Agent, or Firm* — Rabin & Berdo, P.C.

(57) ABSTRACT

A vehicle height adjustment device of the present invention includes a motion conversion unit that includes a rotating member and a linear motion member, and that converts a rotational motion of the rotating member into a linear motion of the linear motion member, a plurality of motors, a driven gear coupled to the rotating member, a plurality of drive gears that meshes with the driven gear, and a spring seat that is coupled to the linear motion member, and that supports one end of a suspension spring interposed between a vehicle body and an axle of a vehicle, wherein after driving the spring seat and then stopping the spring seat, some drive gears of the drive gears are driven in a direction opposite a drive direction of the spring seat.

2 Claims, 5 Drawing Sheets

(56) References Cited

U.S. PATENT DOCUMENTS

2007/0210539 A1    9/2007  Hakui et al.
2015/0224846 A1    8/2015  Kim

FOREIGN PATENT DOCUMENTS

| EP | 2236324 | A2 | * | 10/2010 | ........... B60G 15/063 |
|----|---------|----|---|---------|------------------------|
| JP | H06-346941 | A | | 12/1994 | |
| JP | 2000039057 | A | * | 2/2000 | |
| JP | 2002-193625 | A | | 7/2002 | |
| JP | 2005119578 | A | * | 5/2005 | |
| JP | 2005186192 | A | * | 7/2005 | |
| JP | 2005-247080 | A | | 9/2005 | |
| JP | 2007-253862 | A | | 10/2007 | |
| JP | 4181475 | B2 | * | 11/2008 | |
| JP | 2009-150465 | A | | 7/2009 | |
| JP | 2009-248867 | A | | 10/2009 | |
| JP | 2011-256980 | A | | 12/2011 | |
| JP | 2011256980 | A | * | 12/2011 | |
| JP | 2020083029 | A | * | 6/2020 | ........... B60G 17/015 |
| JP | 2020179717 | A | * | 11/2020 | |
| JP | 2021154868 | A | * | 10/2021 | |

\* cited by examiner

VEHICLE HEIGHT ADJUSTMENT DEVICE

TECHNICAL FIELD

The present invention relates to a vehicle height adjustment device.

BACKGROUND ART

In the related art, for example, as disclosed in JP 2007-253862 A, a vehicle height adjustment device includes a motor, and a feed screw mechanism that drives an upper spring seat that supports one end of a suspension spring that elastically supports the vehicle body by the rotational power of the motor. In this vehicle height adjustment device, a motor is driven to move the upper spring seat vertically to move the upper spring seat closer to or sway from the vehicle body to adjust the vehicle height.

SUMMARY OF INVENTION

With the conventional vehicle height adjustment device, the power of the motor is transmitted to the feed screw mechanism via the gear mechanism. Since in this mechanism, the gear has backlash and play, when a load acts on the spring seat so that the spring seat is closer to and away from the vehicle body, the teeth of the gears collide with each other to generate an abnormal noise.

Therefore, an object of the present invention is to provide a vehicle height adjustment device capable of suppressing the generation of an abnormal noise.

To achieve the above objectives the vehicle height adjustment device of the present invention includes a motion conversion unit that includes a rotating member and a linear motion member, and that converts a rotational motion of the rotating member into a linear motion of the linear motion member, a plurality of motors, a driven gear coupled to the rotating member, a plurality of drive gears that is driven by the respective motors, and that meshes with the driven gear, and a spring seat that is coupled to the linear motion member, and that supports one end of a suspension spring interposed between a vehicle body and an axle of a vehicle, wherein after driving the spring seat and then stopping the spring seat, some drive gears of the drive gears are driven in a direction opposite a drive direction of the spring seat, or some drive gears of the drive gears are driven in the drive direction of the spring seat, and the other drive gears of the drive gears are driven in a direction opposite the drive direction of the spring seat.

DESCRIPTION OF EMBODIMENTS

Figure 1:
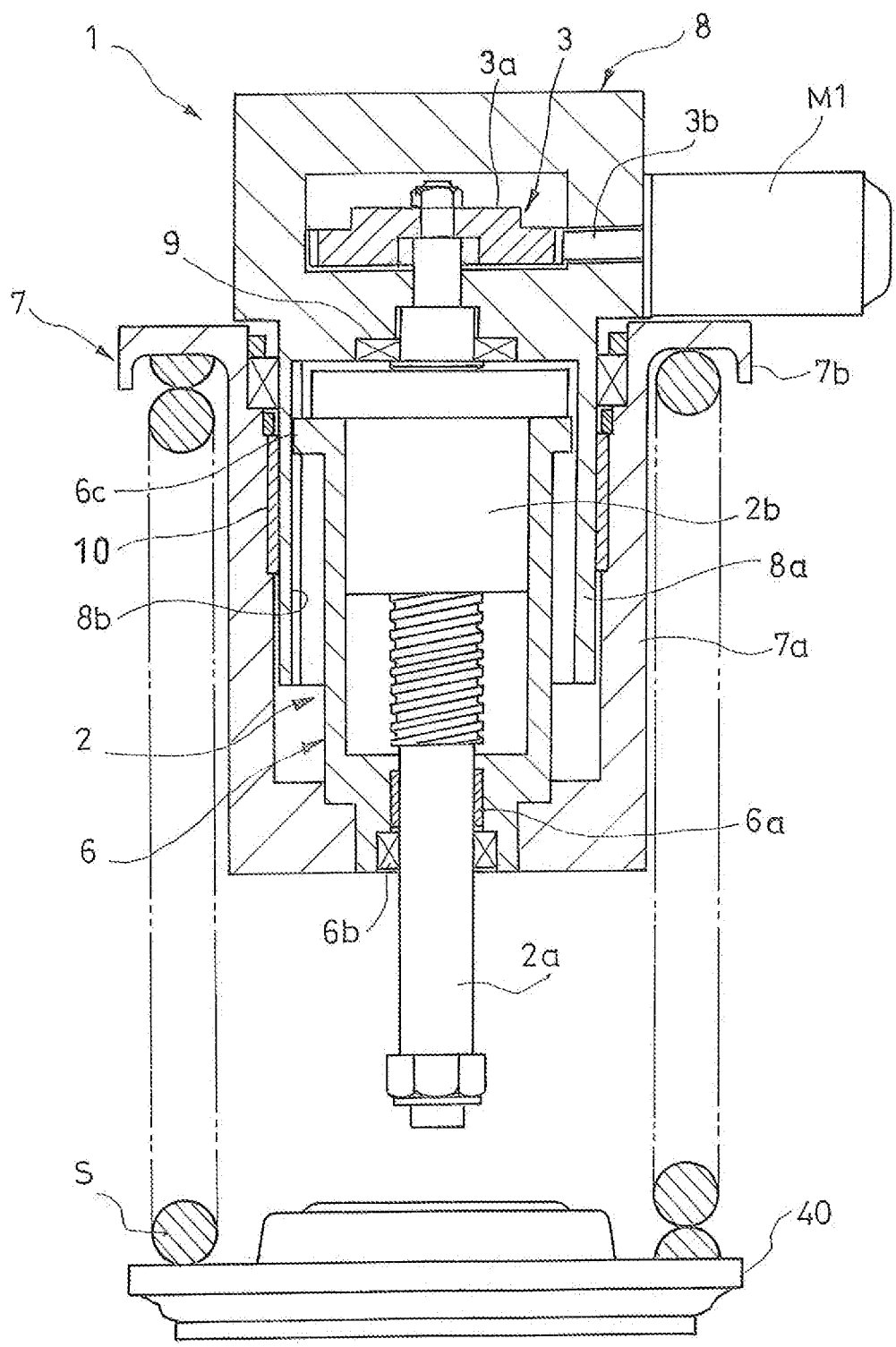
FIG. 1 is a vertical sectional view of a vehicle height adjustment device according to an embodiment.
Figure 2:
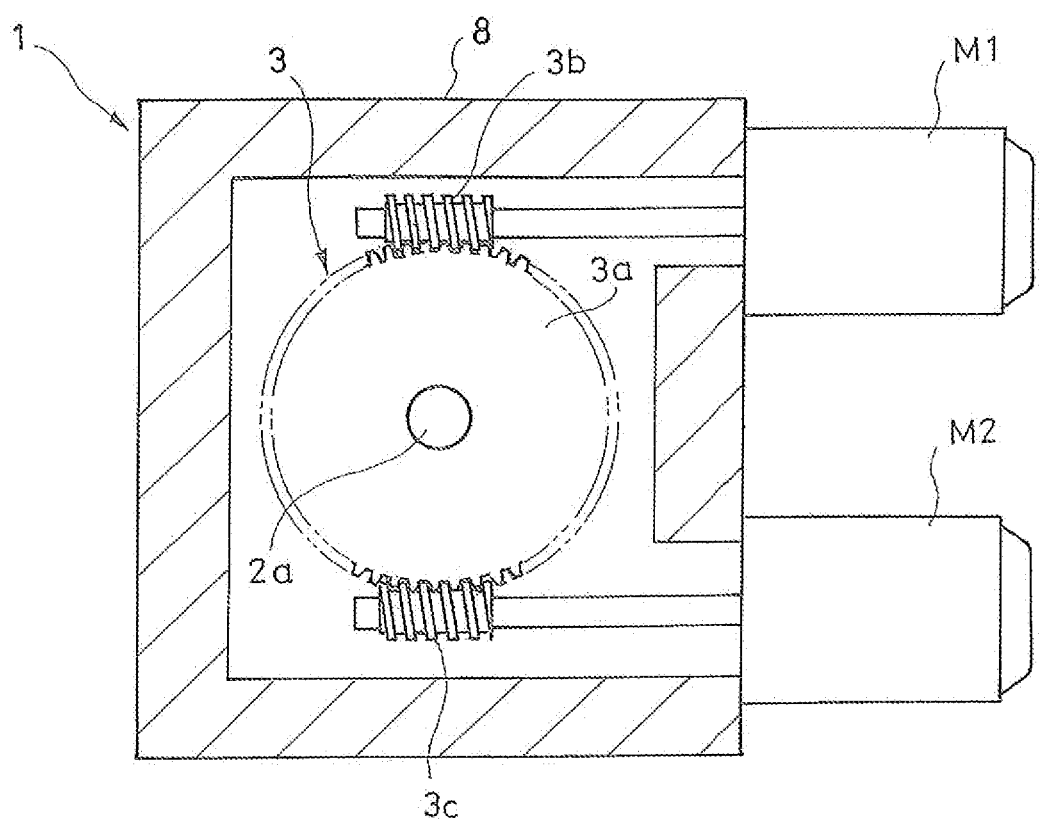
FIG. 2 is a cross-sectional view of a vehicle height adjustment device according to an embodiment.

Hereinafter, a vehicle height adjustment device 1 of the present invention will be described with reference to the drawings. As shown in FIGS. 1 and 2, the vehicle height adjustment device 1 in an embodiment includes a motion conversion unit 2 that converts the rotational motion into the linear motion of the linear motion member, a plurality of motors M1 and M2, a transmission unit 3 that transmits the power of the motors M1 and M2 to the rotating member, and a spring seat 7 driven by the motion conversion unit 2.

Hereinafter, each part of the vehicle height adjustment device 1 will be described in detail. The motion conversion unit 2 includes a screw shaft 2a as a rotating member and a ball nut 2b as a linear motion member. The screw shaft 2a is provided with a screw groove on the outer circumference, and the outer circumference is screwed into the ball nut 2b. Therefore, in the motion conversion unit 2, when the screw shaft 2a exhibits a rotational motion, the ball nut 2b exhibits a linear motion in the vertical direction in FIG. 1. Further, a tubular holder 6 coupled to the spring seat 7 is mounted on the outer circumference of the ball nut 2b.

As described above, the holder 6 has a tubular shape, and includes a bush 6a that pivotally supports the screw shaft 2a on the inner circumference of the lower end of FIG. 1 and a dust seal 6b that slides on the outer circumference of the screw shaft 2a to seal the inside of the holder 6.

The upper end of the screw shaft 2a in FIG. 1 is inserted into a housing 8 accommodating the transmission unit 3 and is supported by a bearing 9 so that it can rotate about the axis with respect to the housing 8.

The housing 8 which is attached to the body of the vehicle and has a hollow inside is a case accommodating the transmission unit 3 and includes a guide cylinder 8a, which and is inserted at the lower end in FIG. 1 between the outer circumference of the holder 6 and the inner circumference of a cylindrical portion 7a of the spring seat 7. A tubular bush 10 is inserted between the guide cylinder 8a and the cylindrical portion 7a of the spring seat 7, and the spring seat 7, the holder 6, and the ball nut 2b can be guided by the guide cylinder 8a of the housing 8 to smoothly move in the axial direction which is the vertical direction in FIG. 1 without an axis deflection. Further, the holder 6 includes the bush 6a that pivotally supports the lower part of the screw shaft 2a in FIG. 1, the eccentricity is suppressed by the guide cylinder 8a with respect to the housing 8, and the upper part of the screw shaft 2a is pivotally supported by the bearing 9 provided in the housing 8. Therefore, the screw shaft 2a can smoothly rotate without being eccentric with respect to the housing 8 and the ball nut 2b.

Further, a key groove 8b is formed on the inner circumference of the guide cylinder 8a along the axial direction which is the vertical direction in FIG. 1, and a key 6c at the outer circumference of the upper end of the holder 6 in FIG. 1 is inserted in the key groove 8b. Therefore, since the ball nut 2b is whirl-stopped with respect to the housing 8, when the screw shaft 2a is rotationally driven, the ball nut 2b can be reliably moved in the axial direction without rotating together with the screw shaft 2a.

The spring seat 7 supports the upper end, which is the vehicle body side end of a suspension spring S, which is interposed between the vehicle body and the wheels of the vehicle (not shown), the ball nut 2b of the motion conversion unit 2 is driven in the vertical direction and moves up and down to be closer to and away from the vehicle body (not shown). The lower end of the suspension spring S is supported by a lower spring seat 40 attached to the suspension member of the wheel. Therefore, when the screw shaft 2a is rotationally driven to move the ball nut 2b in the vertical direction, the spring seat 7 moves closer to and away from the vehicle body and the vehicle height can be adjusted. The spring seat 7 includes a bottomed tubular cylindrical portion 7a having a hole at the bottom and a flange 7b provided on the outer circumference of the upper end of the cylindrical portion 7a in FIG. 1, and the flange 7b supports the upper end of the suspension spring S. The spring seat 7 is integrated with the holder 6 in a state where the lower end of the holder 6 in FIG. 1 is fitted to the bottom of the cylindrical portion 7a.

As shown in FIGS. 1 and 2, in the present embodiment, the transmission unit 3 includes a worm wheel 3a as a driven gear attached to the outer circumference of the upper end of the screw shaft 2a, and a pair of worms 3b and 3c as drive gears that mesh with the worm wheel 3a with the worm wheel 3a interposed in the radial direction. The worm wheel 3a together with the screw shaft 2a can rotate in the housing 8. The worm 3b is coupled to a rotor (not shown) of the motor M1 fixed to the right of the housing 8 in FIG. 2, and similarly, the worm 3c is coupled to a rotor (not shown) of the motor M2 fixed to the right of the housing 8 in FIG. 2.

In the embodiment, when rotating the worm wheel 3a counterclockwise in FIG. 2, the worm 3b at the upper side of FIG. 2 is rotated by the motor M1 counterclockwise when viewed from the motor M1, and the worm 3c at the lower side of FIG. 2 is rotated by the motor M2 clockwise when viewed from the motor M2. On the contrary, when rotating the worm wheel 3a clockwise in FIG. 2, the worm 3b at the upper side of FIG. 2 is rotated by the motor M1 clockwise when viewed from the motor M1, and the worm 3c at the lower side of FIG. 2 is rotated by the motor M2 counterclockwise when viewed from the motor M2. When the worm wheel 3a is driven to rotate in this way, the screw shaft 2a can rotate together with the worm wheel 3a to drive the ball nut 2b in the vertical direction, and the vertical movement of the ball nut 2b causes the spring seat 7 to move in the vertical direction to be closer to and away from the vehicle body. Therefore, when the motors M1 and M2 are driven, the relative distance between the spring seat 7 and the vehicle body can be adjusted, whereby the vehicle height adjustment device 1 can adjust the vehicle height of the vehicle. In this document, the rotation direction of the worms 3b and 3c always refers to the rotation direction when the worms 3b and 3c are viewed from the motors M1 and M2.

Figure 3:
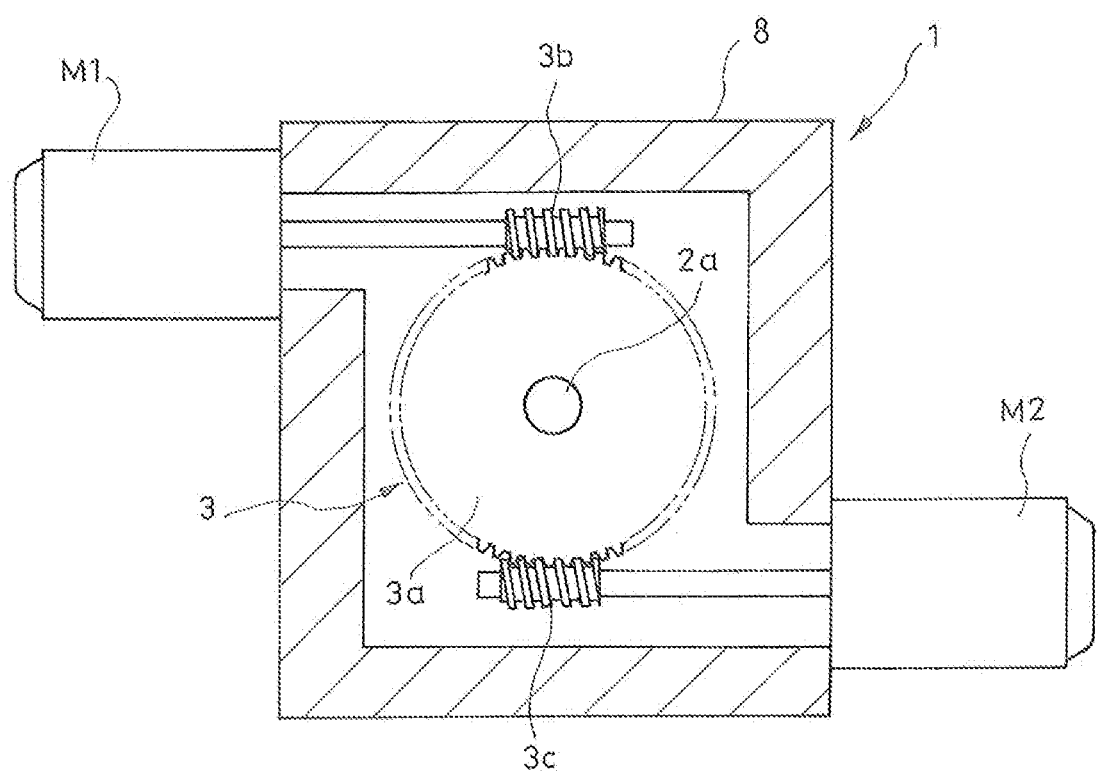
FIG. 3 is a cross-sectional view of a first modification of a vehicle height adjustment device according to an embodiment.

In the present embodiment, the motors M1 and M2 are motors having the same specifications, are DC motors, and are rotationally driven by receiving electric power supplied from a power source (not shown). The motors M1 and M2 may not have the same specification, but when the motors have the same specification, it is easy to manage the current and torque when driving the worms 3b and 3c at a constant speed. The motors M1 and M2 are controlled by a control apparatus (not shown) and are rotationally driven independently of each other, so that the worms 3b and 3c can be independently rotationally driven to either clockwise or counterclockwise. In the embodiment, even when the worm wheel 3a rotates clockwise or counterclockwise, the worms 3b and 3c rotate in opposite directions, so that the motors M1 and M2 are driven in opposite directions to drive the spring seat 7 to a desired position. As shown in FIG. 3, when the worms 3b and 3c mesh with each other in opposite directions with respect to the worm wheel 3a, even when the worm wheel 3a rotates clockwise or counterclockwise, the worms 3b and 3c rotate in the same direction, so that in this case, the motors M1 and M2 may be driven in the same direction to drive the spring seat 7 to a desired position.

Figure 4:
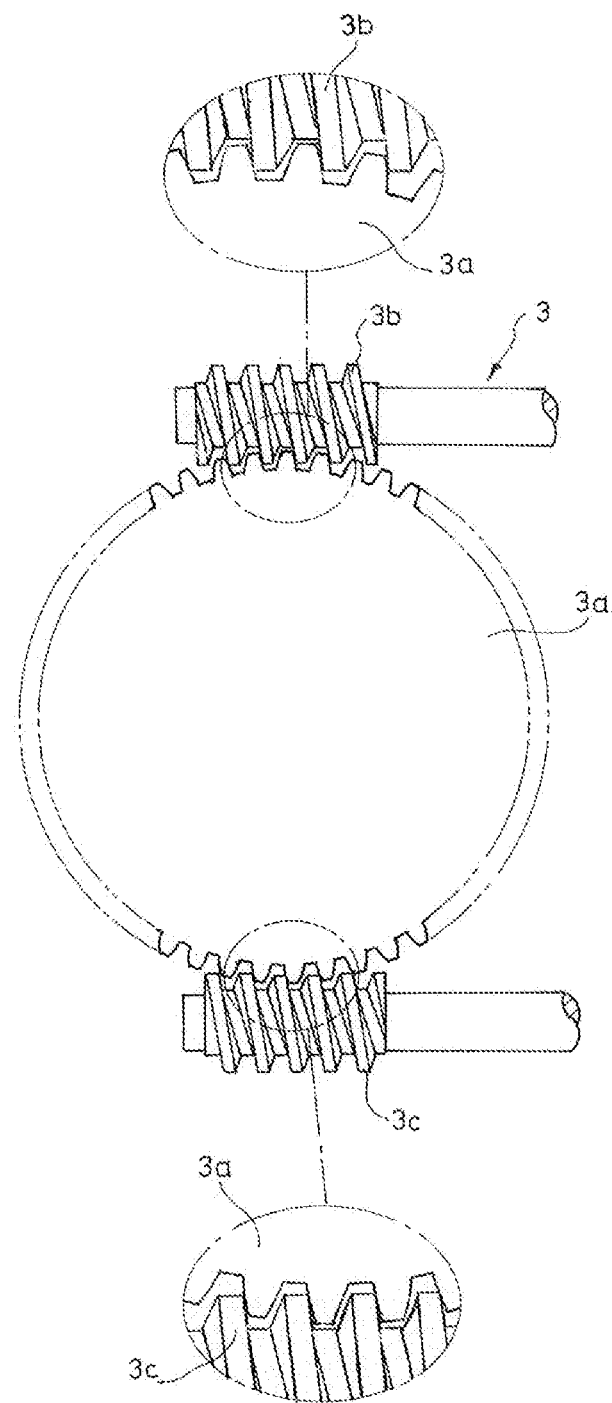
FIG. 4 is a plan view of a driven gear and a drive gear immediately after a spring seat is driven and stopped.

Then, when the spring seat 7 is driven in this way to displace the spring seat 7 to a desired position and stop the motors M1 and M2, the spring seat 7 stops at the desired position. Assuming that the worm wheel 3a was driven counterclockwise in FIG. 2 to move the spring seat 7, when worms 3b and 3c are stopped, the teeth of the worms 3b and 3c are in contact with only the right side face of the teeth of the worm wheel 3a in FIG. 4 when viewed from the center of the worm wheel 3a as shown in FIG. 4. On the contrary, assuming that the worm wheel 3a is driven clockwise in FIG. 2 to move the spring seat 7, when worms 3b and 3c are stopped, the teeth of the worms 3b and 3c are in contact with only the left side face of the teeth of the worm wheel 3a when viewed from the center of the worm wheel 3a. In this state, there is play for backlash between the teeth of the worm wheel 3a and the teeth of worms 3b and 3c, and the worm wheel 3a can rotate by the amount of backlash in the circumferential direction.

Figure 5:
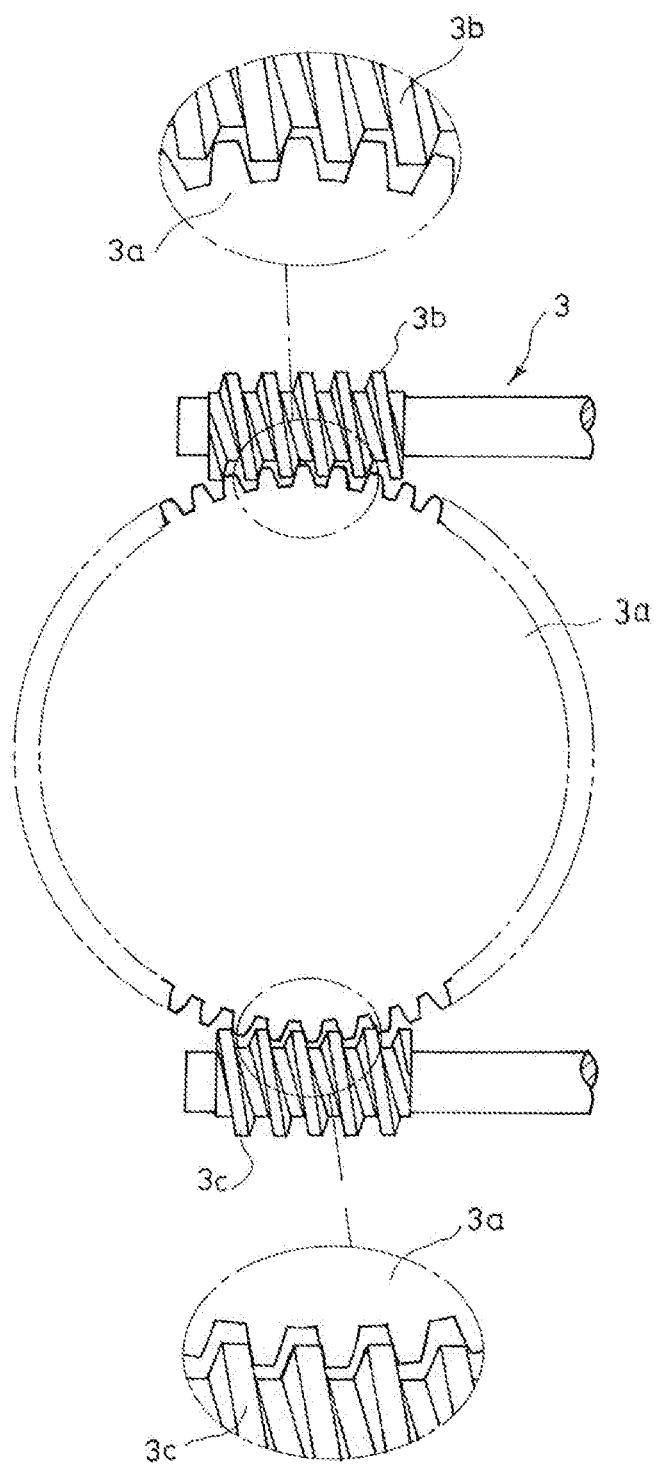
FIG. 5 is a plan view of the driven gear and the drive gear in a state where the drive gear is driven after the spring seat is driven and stopped.

Therefore, in the present embodiment, after driving the spring seat 7 to displace it to the desired position and stopping the motors M1 and M2, the vehicle height adjustment device 1 drives and stops either the motor M1 or the motor M2 in a direction different from the rotation direction in which the spring seat 7 was previously driven for the vehicle height adjustment. FIG. 5 shows the state in which the worm 3b is driven and stopped in the direction of driving the worm wheel 3a clockwise after the state shown in FIG. 4, that is, the state in which the worm wheel 3a is rotated counterclockwise and stopped. As shown in FIG. 5, the worm 3b is rotationally driven by the amount of backlash and stops in the state in which its teeth are in contact with the left side face of the teeth of the worm wheel 3a in FIG. 4 when viewed from the center of the worm wheel 3a. On the other hand, the teeth of the undriven worm 3c are still in contact with the right side face of the teeth of the worm wheel 3a. When the worms 3b and 3c are in contact with the worm wheel 3a in this way, even when the worm wheel 3a tries to rotate, the teeth of the worm wheel 3a mesh with the teeth of the worm 3b or the worm 3c and the worm wheel 3a cannot rotate. When the worm wheel 3a is driven clockwise to move the spring seat 7, one of the worms 3b and 3c may be driven in the direction of driving the worm wheel 3a counterclockwise. In this case, even when the worm wheel 3a tries to rotate, the teeth of the worm wheel 3a mesh with the teeth of the worm 3b or the worm 3c and the worm wheel 3a cannot rotate.

Therefore, when the motors M1 and M2 are rotationally driven and then stopped in this way, and furthermore, one of the motors M1 and M2 is driven in a direction opposite the previous direction and stopped, the worm wheel 3a and the worms 3b and 3c mesh with each other as described above, and the worm wheel 3a cannot rotate. The motors M1 and M2 are rotationally driven, and then are stopped and while driving one of the motors M1 and M2 in a direction same as the direction (drive direction) in which the motors were driven to move the spring seat 7, the other of the motors M1 and M2 may be driven and stopped in a direction opposite the drive direction. As a result, the worm wheel 3a and the worms 3b and 3c mesh with each other as described above, and the worm wheel 3a cannot rotate.

As described above, the vehicle height adjustment device 1 of the present invention includes the motion conversion unit 2 that includes the screw shaft (rotating member) 2a and the ball nut (linear motion member) 2b, and that converts the rotational motion of the screw shaft (rotating member) 2a into the linear motion of the ball nut (linear motion member) 2b, the plurality of motors M1 and M2, the worm wheel (driven gear) 3a coupled to the screw shaft (rotating member) 2a, and the plurality of worms (drive gears) 3b and 3c that is driven by the respective motors M1 and M2, and that meshes with the worm wheel (driven gear) 3*a*, and the spring seat 7 that is coupled to the ball nut (linear motion member) 2*b*, and that supports one end of the suspension spring S interposed between the vehicle body and the axle of the vehicle, wherein after driving the spring seat 7 and stopping it, some drive gears of the worms (drive gears) 3*b* and 3*c* are driven in a direction opposite the drive direction of the spring seat 7, or some drive gears of the worms (drive gears) 3*b* and 3*c* are driven in the drive direction of the spring seat 7, and the other drive gears of the worms (drive gears) 3*b* and 3*c* are driven in a direction opposite the drive direction of the spring seat 7.

In the vehicle height adjustment device 1 configured in this way, after stopping the spring seat 7 at the desired position, a plurality of worms (drive gears) 3*b* and 3*c* can mesh with the worm wheel (driven gear) 3*a* so as not to rotate the worm wheel (driven gear) 3*a*. Therefore, according to the vehicle height adjustment device 1, since the worm wheel (driven gear) 3*a* have no play and cannot rotate, and collision between the worm wheel (driven gear) 3*a* and a plurality of worms (drive gears) 3*b* and 3*c* is prevented, so that the generation of an abnormal noise can be suppressed.

In addition, as mentioned above, the transmission unit 3 includes the worm wheel 3*a* which is a driven gear and the worms 3*b* and 3*c* which are drive gears, but it suffices to have a driven gear and a drive gear, so that it may be configured by another gear mechanism. Further, three or more drive gears may be provided, and the number of motors installed may be the number corresponding to the number of the drive gears. It should be noted that the plurality of drive gears may include those that are rotationally driven so as to move the spring seat 7 in a direction opposite the drive direction of the spring seat 7 only in order to eliminate the play described above. That is, among the plurality of drive gears, there may be a gear that is not used for driving the spring seat 7 but is used only for eliminating the above-mentioned play.

Further, in the motion conversion unit 2, the rotating member is the screw shaft 2*a* and the linear motion member is the ball nut 2*b*, but the rotating member may be connected to the transmission unit 3 as the ball nut 2*b*, and the linear motion member may be connected to the spring seat 7 as the screw shaft 2*a*. Further, the motion conversion unit 2 may include a trapezoidal screw and a nut screwed into the trapezoidal screw. Even in this case, the trapezoidal screw and one end of the nut may be a rotating member and the other end may be a linear motion member.

Although the preferred embodiments of the present invention have been described above in detail, modifications, variations, and changes are possible without departing from the scope of the claims.

This application claims priority under Japanese Patent Application No. 2018-220072 filed with the Japan Patent Office on Nov. 26, 2018, the entire contents of which are incorporated herein by reference.

The invention claimed is:

1. A vehicle height adjustment device comprising:
   a motion conversion unit that includes a rotating member and a linear motion member, and that converts a rotational motion of the rotating member into a linear motion of the linear motion member;
   a plurality of motors;
   a driven gear coupled to the rotating member;
   a plurality of drive gears that is driven by the respective motors, and that meshes with the driven gear; and
   a spring seat that is coupled to the linear motion member, and that supports one end of a suspension spring interposed between a vehicle body and an axle of a vehicle, wherein
   after driving the spring seat and then stopping the spring seat, some drive gears of the drive gears are driven in a direction opposite a drive direction of the spring seat.

2. A vehicle height adjustment device comprising:
   a motion conversion unit that includes a rotating member and a linear motion member, and that converts a rotational motion of the rotating member into a linear motion of the linear motion member;
   a plurality of motors;
   a driven gear coupled to the rotating member;
   a plurality of drive gears that is driven by the respective motors, and that meshes with the driven gear; and
   a spring seat that is coupled to the linear motion member, and that supports one end of a suspension spring interposed between a vehicle body and an axle of a vehicle, wherein
   after driving the spring seat and then stopping the spring seat, some drive gears of the drive gears are driven in a drive direction of the spring seat, and the other drive gears of the drive gears are driven in a direction opposite the drive direction of the spring seat.

\* \* \* \* \*